Dec. 19, 1967  C. A. SECKERSON  3,359,028
LOCKING STAY

Filed Nov. 12, 1965  2 Sheets-Sheet 1

INVENTOR
Clifford Alexander Seckerson
by Philip E. Parker
Attorney.

Dec. 19, 1967  C. A. SECKERSON  3,359,028
LOCKING STAY
Filed Nov. 12, 1965  2 Sheets-Sheet 2
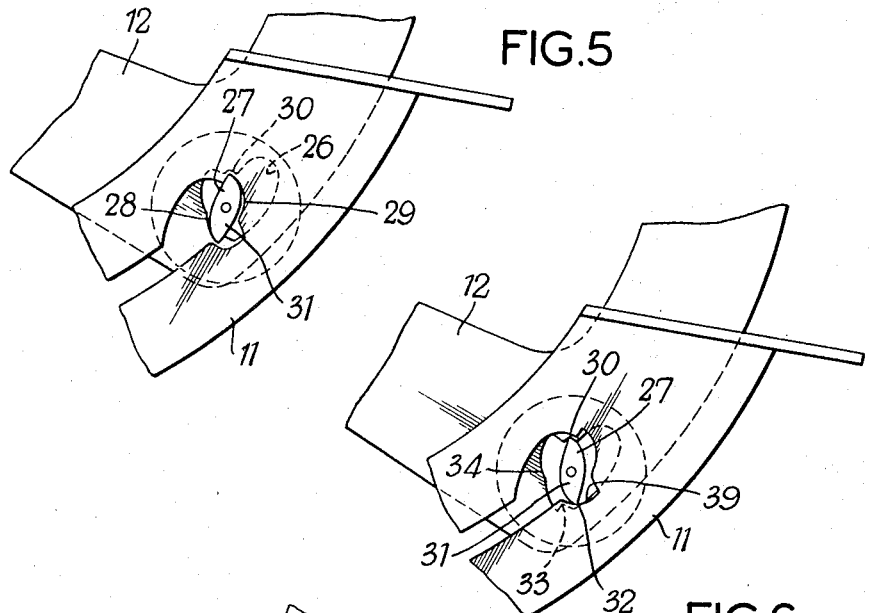
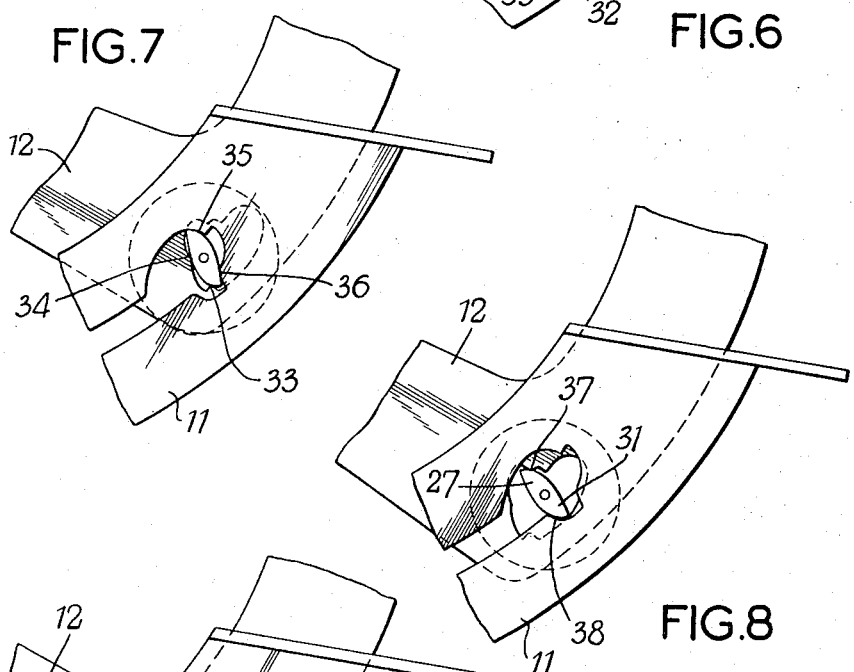
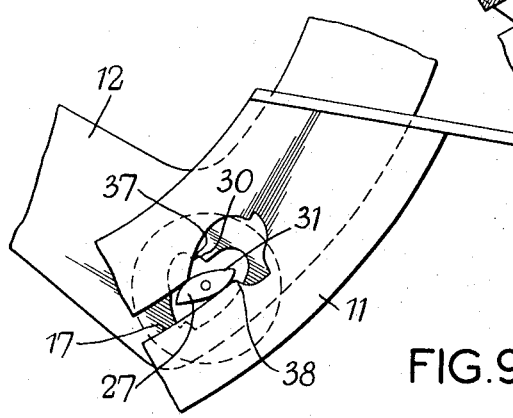
INVENTOR
Clifford Alexander Seckerson
by Philip E. Parker
Attorney.

3,359,028
LOCKING STAY
Clifford Alexander Seckerson, Iver Heath, England, assignor to United-Carr Incorporated, Boston, Mass., a corporation of Delaware
Filed Nov. 12, 1965, Ser. No. 507,366
Claims priority, application Great Britain, Nov. 11, 1964, 45,967/64
3 Claims. (Cl. 292—263)

ABSTRACT OF THE DISCLOSURE

The present invention relates to a locking stay of the type comprising two relatively movable members having two overlying arms each formed with a slot partially overlying and in register with a slot in the other arm and a pawl having a part of its thickness accommodated in one slot and a part of its thickness accommodated in the other slot, the bounding walls of the slots being so shaped that on successive relative movements of the members alternately in a forward and an opposite reverse direction, the pawl is progressively rotated in the slots into a first position in which further forward movement is prevented, a second position in which further reverse movement is prevented, a third position in which further forward movement is prevented and a fourth position in which reverse movement beyond the second limited position is allowed, wherein the pawl is held in position in the slots by two flanges, each of which is attached non-rotatably to the pawl and each of which bears resiliently against the outer surface of one of the arms.

---

In patent specification No. 3,141,694, there is disclosed a locking stay comprising two pivotted arms, each formed with a shaped slot, and a pawl located in the slots and adapted by virtue of its shape and the shaping of the bounding walls of the slots to prevent the arms from returning more than a few degrees towards the closed position from the fully open position unless and until the arms are fully opened a second time.

In this known device the pawl which locks the arms against closing is located closely adjacent the pivotal axis of the two arms and is normally held, so as to maintain its orientation relative to the bounding walls of the slots by two resilient, circular caps which are clamped to the arms at the pivot point of the arms by the pivot pin used to pivot the arms together.

The above described mechanism of Patent No. 3,141,694 has the disadvantage that, if the arms are relatively long the shear force exerted on the pawl through the leverage of the arms is very considerable.

It is an object of the present invention to provide a stay mechanism which is an improvement on the mechanism of Patent No. 3,141,694 and which obviates or reduces the strain imposed on the pawl when the arms of the mechanism are relatively long.

Figure 1:
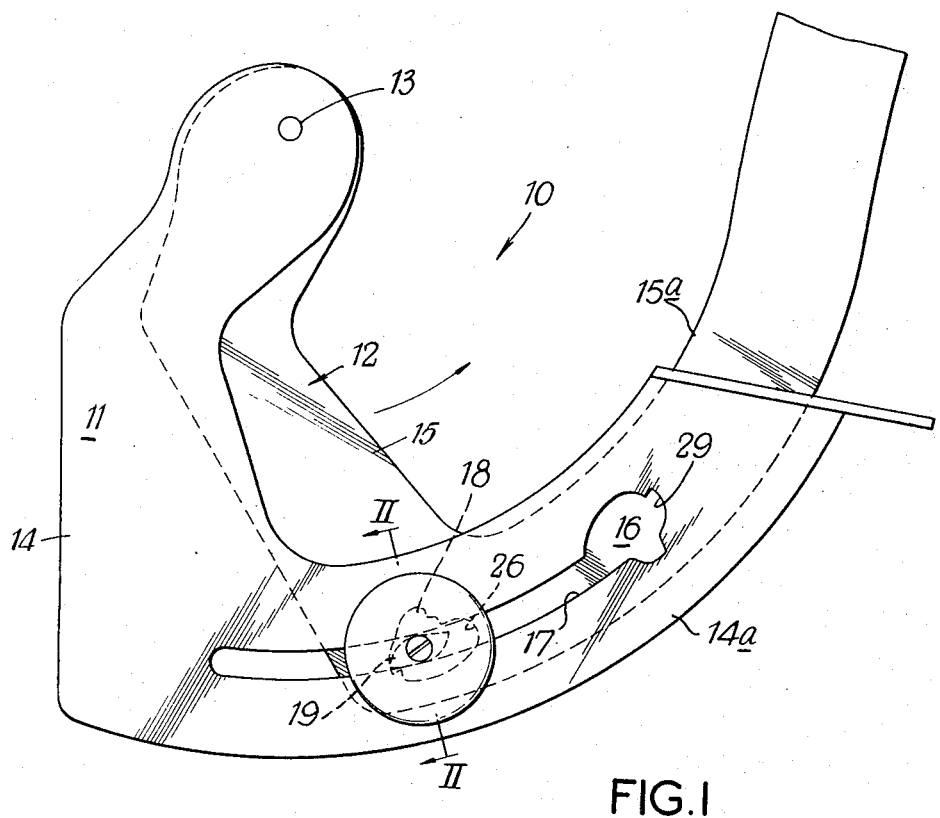
Figure 2:
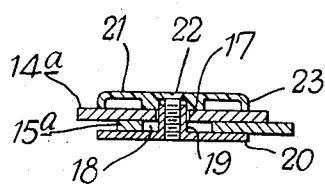
Figure 3:
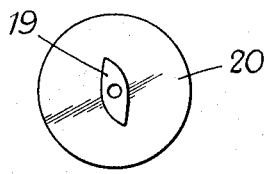
Figure 4:
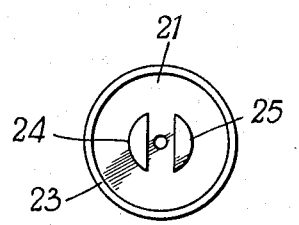

A preferred form of the present invention will now be described with reference to the accompanying diagrammatic drawings in which:

FIGURE 1 is an elevation of a locking stay,
FIGURE 2 is a section on the line II—II of FIGURE 1,
FIGURE 3 is an elevation of one part of the stay of FIGURE 1,
FIGURE 4 is an elevation of another part of the stay of FIGURE 1,
FIGURE 5 is an elevation of the stay with the arms in the fully open position and the pawl in a first rotated position, a flange being removed,
FIGURE 6 is an elevation similar to FIGURE 5 showing the pawl in the second rotated position and the arms locked against closing,
FIGURE 7 is an elevation similar to FIGURE 6 showing the arms fully open and the pawl in the third rotated position,
FIGURE 8 is an elevation similar to FIGURE 7 showing the arms in the process of being closed and the pawl moving into the fourth rotated position, and
FIGURE 9 is an elevation similar to FIGURE 8 showing the pawl in the fourth rotated position.

In FIGURE 1 a locking stay is indicated generally at 10, which comprises two generally L-shaped arms 11 and 12 pivoted together at 13 for relative rotation. Each arm 11 and 12 comprises stem portions 14, 15, which are pivoted at 13 and base portions 14a, 15a, which are curved on an approximate radius from the axis of rotation of the two arms.

The curved portions 14a and 15a overlie one another and their adjacent surfaces are in sliding engagement. The curved portion 14a has a slot 16, which has an arcuate extension 17 formed on an approximate radius from the axis of rotation of the two arms, and the curved portion 15a has a slot 18.

An approximately lanceolate shaped pawl 19, which is formed integrally with a circular metal flange 20, extends through the slots 16 and 18 with the circular metal flange 20 in sliding engagement on the outer surface of the curved portion 15a. The end of the pawl 19 projects from the slot 16 and a resilient synthetic plastics cap 21 is attached to the pawl by a screw 22. The cap 21 is formed with a peripheral lip 23, which bears resiliently against the outer surface of the curved portion 14a, and with two spaced lugs 24 and 25 between which the pawl is located and held against rotation relative to the cap.

The frictional resistance to movement between the cap 21 and the arm 11 is greater than that between the metal flange 20 and the arm 12 and thus, when the arm 12 is moved relative to the arm 11 the pawl 19 and cap 21 stay with the arm 11 until the pawl is engaged by an edge portion of the slot 18 and drawn along the slot 16 with the arm 12.

Relative movement between the arms 11 and 12 is limited by the length of the slots 16 and 18 and in one of the two limiting positions, that is when the pawl 19 is held between the end of the extension 17 and an edge portion 26 of the slot 18, the arms 11 and 12 overlie one another in the closed position.

If the arms 11 and 12 are now opened by rotating the arm 12 in the forward anticlockwise direction the pawl 19 is carried along the extension 17 by a curved edge portion 28 of the slot 18 until the end 27 of the pawl strikes the curved edge 29 of the slot 16. The curved edges 28, 29 act as camming surfaces for the pawl 19 and further movement of the arm 12 forwardly rotates the pawl 19 into the position shown in FIGURE 5, in which further forward movement of the arm 12 relative to the arm 11 is prevented.

If the arm 12 is now reversely rotated, in the clockwise direction relative to the arm 11, the pawl 19 initially stays with the arm 11 until a notch 30 in the slot 18 engages the end 27 of the pawl and carries the pawl reversely until the end 31 of the pawl abuts an edge 32 of the slot 16, as shown in FIGURE 6. Further rotation of the pawl 19 is prevented by the edge 32 and thus further reverse movement of the arm 12 relative to the arm 11 is also prevented.

If the arm 12 is now rotated forwardly again, the pawl 19 stays with the arm 11 until an edge of a projection 33 in the slot 18 engages the end 31 of the pawl and rotates the pawl in an anticlockwise direction until the point 34 in the edge of the slot 18 engages the pawl which is then carried with the arm 12 into engagement with edge portions 35 and 36 of the slot 16. Further movement of the arm 12 in the forward direction is again prevented but if the arm 12 is reversely rotated in the clockwise direction relative to the arm 11 the pawl remains stationary with the arm 11 until an edge portion 37 of the slot 18 engages the end 27 of the pawl. When this occurs the pawl 19 rides down on to a curved edge portion 38 of the slot 16 and into the position shown in FIGURE 8. Further reverse movement of the arm 12 causes the edge portion 37 to tip the end 27 of the pawl over and into alignment with the arcuate extension 17 of the slot 16 as shown in FIGURE 9. The arm 12 can then be reversely rotated until the locking stay is in the fully closed position.

In the locking stay 10 the pawl 19 is designed to stay with the stationary arm 11 until a positive pull is exerted upon it through an edge portion of the slot 18 in the arm 12. This is achieved by placing the resilient synthetic plastics cap 21 adjacent the arm 11 and the metal flange 20 which creates less frictional resistance adjacent the arm 12. If desired, the arrangement can be reversed so that the pawl 19 will follow the moving arm 12 until it is prevented from doing so by engagement with an edge portion of the slot 16 in the arm 11.

The pawl 19 can also be held in the slots in the two arms by two metal flanges or by two plastics caps, provided that in each case htere is sufficient frictional engagement between the flanges or the caps and the outside surfaces of the arms to hold the pawl normally firmly in position relative to the arms.

It will be seen that the pawl 19, flange 20, cap 21 and screw 22 serve to hold the arms 11 and 12 in sliding engagement. In cases where the load placed on the arms 11 and 12 is heavy it may be necessary to provide additional means for preventing the two arms from twisting out of sliding engagement.

In one particular application two of the locking stays 10 can be used to hold a vehicle bonnet in the open position by attaching the arm 11 of each stay rigidly to the vehicle frame on either side of the bonnet and the movable arms 12 to the bonnet itself. If the bonnet is then lifted into the fully open position once and then lowered it closes a few degrees and then automatically locks against further closing. If it is then fully opened a second time it can be lowered and fully closed.

It will be appreciated that the locking stay 10 has many applications, not only on vehicles, where it is necessary to hold a member temporarily in a raised position.

It will be understood that further modifications may be made to the embodiments described above without departing from the spirit and scope of the invention which is best defined by the following claims.

What I claim is:

1. A locking stay comprising a first member and a second member connected together for pivotal movement in a forward and a reverse direction, each member being generally flat and formed with a surface overlying a surface of the other member and movable thereover during relative movement of the two members and with a through slot spaced a substantial distance from the pivotal axis of the two members partially overlying the through slot in the other member and there being provided a double ended pawl having its thickness extending partly through each slot and held therein by a first flange from which the pawl extends and with which it is integral, and a second flange having means of extending therefrom, from engaging said pawl and preventing rotation therewith, and said flanges each bearing against a member so as to constrain the pawl to normally maintain its orientation in the slots, the slots being formed with bounding walls so shaped that on successive relative movements of the members alternately in the forward direction and in the reverse direction the pawl is cammed by the walls successively into progressively rotated positions, the pawl being engaged by the walls of the two slots, in a first and a third of said rotated positions, to prevent further relative movement of the members in the forward direction and, in the second of said rotated positions, to prevent further relative movement in the reverse direction, and the pawl, in the fourth of its said rotated positions, being generally aligned with the permitted direction of relative movement and with an extension in that direction of at least one of the slots, said extension being aligned on an arc centered on the pivot point of the two members thereby permitting movement of the extended slot and of the associated member, relative to the aligned pawl and the other member, in the reverse direction to a relative position of the members which is substantially displaced, in the reverse direction of relative movement, from their relative position as limited, in that direction by the pawl in its said second rotated position.

2. A locking stay as claimed in claim 1, in which the frictional resistance to movement between one of the flanges and the member adjacent thereto is greater than that between the other of the flanges and the member adjacent thereto, whereby the pawl and the flanges will normally move with the member adjacent the said one flange.

3. A locking stay comprising a first, generally L-shaped plate-like member pivotally connected to a second generally L-shaped plate-like member, each member being formed with an arm spaced from the pivotal axis thereof and extending generally tangentially thereto said arm overlying a similar arm of the other member and movable thereover during relative pivotal movement of the two members and said arm being formed with a through slot partially overlying a through slot in the other member, said slots spaced a substantial distance from the pivotal axis of said members and the longitudinal centerline of said slots located on an arc centered on the pivot point of the members, there being provided a double ended pawl having its thickness extending partly through each slot and held therein by two flanges each of which is non-rotatably attached to the pawl and bears resiliently against the outer surface of one of the arms, the flanges cooperatively clamping the two arms together and constraining the pawl to normally maintain its orientation in the slots, the slots being formed with bounding walls so shaped that on successive relative movements of the members alternately in the forward direction and in the reverse direction the pawl is cammed by the walls successively into progressively rotated positions, the pawl being engaged by the walls of the two slots, in a first and a third of said rotated positions, to prevent further relative movement of the members in the forward direction and, in the second of said rotated positions, to prevent further relative movement in the reverse direction, and the pawl, in the fourth of its said rotated positions, being generally aligned with the permitted direction of relative movement and with an extension in that direction of at least one of tre slots, said extension permitting movement of the extended slot and of the associated member, relative to the aligned pawl and the other member, in the reverse direction to a relative position of the members which is substantially displaced, in the reverse direction of relative movement, from their relative position as limited, in that direction by the pawl in its said second rotated position.

References Cited

UNITED STATES PATENTS

| 2,566,182 | 8/1951 | Flynn | 292—267 |
| 3,141,694 | 7/1964 | Birmingham | 16—139 |
| 3,285,647 | 11/1966 | Birmingham | 292—263 |

FOREIGN PATENTS

| 4,693 | 1879 | Great Britain. |
| 355,556 | 8/1931 | Great Britain. |
| 594,981 | 11/1947 | Great Britain. |

MARVIN A. CHAMPION, *Primary Examiner.*

EDWARD J. McCARTHY, *Assistant Examiner.*